(12) United States Patent
Hadley

(10) Patent No.: US 10,578,464 B2
(45) Date of Patent: Mar. 3, 2020

(54) IDENTIFICATION OF FEATURES ON AN OPTICAL FIBER USING A DISTRIBUTED TEMPERATURE SENSOR

(71) Applicant: SCHLUMBERGER TECHNOLOGY CORPORATION, Sugar Land, TX (US)

(72) Inventor: Maxwell Richard Hadley, Southampton (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 315 days.

(21) Appl. No.: 15/354,596

(22) Filed: Nov. 17, 2016

(65) Prior Publication Data

US 2017/0146409 A1    May 25, 2017

Related U.S. Application Data

(60) Provisional application No. 62/259,361, filed on Nov. 24, 2015.

(51) Int. Cl.
*G01K 1/14* (2006.01)
*G01D 5/353* (2006.01)
*G01K 11/32* (2006.01)
*G01K 3/10* (2006.01)

(52) U.S. Cl.
CPC ......... *G01D 5/353* (2013.01); *G01D 5/35358* (2013.01); *G01K 3/10* (2013.01); *G01K 11/32* (2013.01)

(58) Field of Classification Search
None
See application file for complete search history.

(56) References Cited

U.S. PATENT DOCUMENTS

| 7,215,416 B2 | 5/2007 | Yamate et al. |
| 7,251,038 B2 | 7/2007 | Mcinnes et al. |
| 7,292,345 B2 | 11/2007 | Hadley et al. |
| 7,412,117 B2 | 8/2008 | Chen et al. |
| 7,730,936 B2 | 6/2010 | Hernandez-Solis et al. |

(Continued)

FOREIGN PATENT DOCUMENTS

WO    WO2015153549 A1    10/2015

OTHER PUBLICATIONS

Mackay, D. J. C., "An Example Inference Task: Clustering" Chapter 20 in Information Theory, Inference and Learning Algorithms, Cambridge University Press, 2003, 13 pages.

*Primary Examiner* — Lisa M Caputo
*Assistant Examiner* — Nasir U Ahmed

(57) ABSTRACT

A distributed temperature sensing (DTS) system is connected to a buried fiber optic cable that is used to monitor a structure. The DTS system is operated to obtain temperature measurements along the length of the fiber cable. The temperature measurements are then used to calculate a measure of diurnal temperature variability at each point along the cable. This calculation is used to identify points at which the diurnal temperature variability changes rapidly over a short length of the cable. These points can be identified with features along the cable, such as splice chambers, where the cable burial conditions change. The known geographic location of these features can then be identified with specific distances along the fiber.

23 Claims, 5 Drawing Sheets

(56) References Cited

U.S. PATENT DOCUMENTS

| | | |
|---|---|---|
| 8,177,424 B2 | 5/2012 | Hampson et al. |
| 8,401,401 B2 | 3/2013 | Hartog et al. |
| 8,788,251 B2 | 7/2014 | Weng et al. |
| 8,910,714 B2 | 12/2014 | Tardy et al. |
| 2003/0174924 A1* | 9/2003 | Tennyson ........... G01D 5/35383 385/12 |
| 2005/0140966 A1 | 6/2005 | Yamate et al. |
| 2006/0010973 A1 | 1/2006 | Brown |
| 2006/0115204 A1 | 6/2006 | Marsh et al. |
| 2015/0253458 A1* | 9/2015 | Purnhagen ............. G01K 11/00 374/136 |

\* cited by examiner

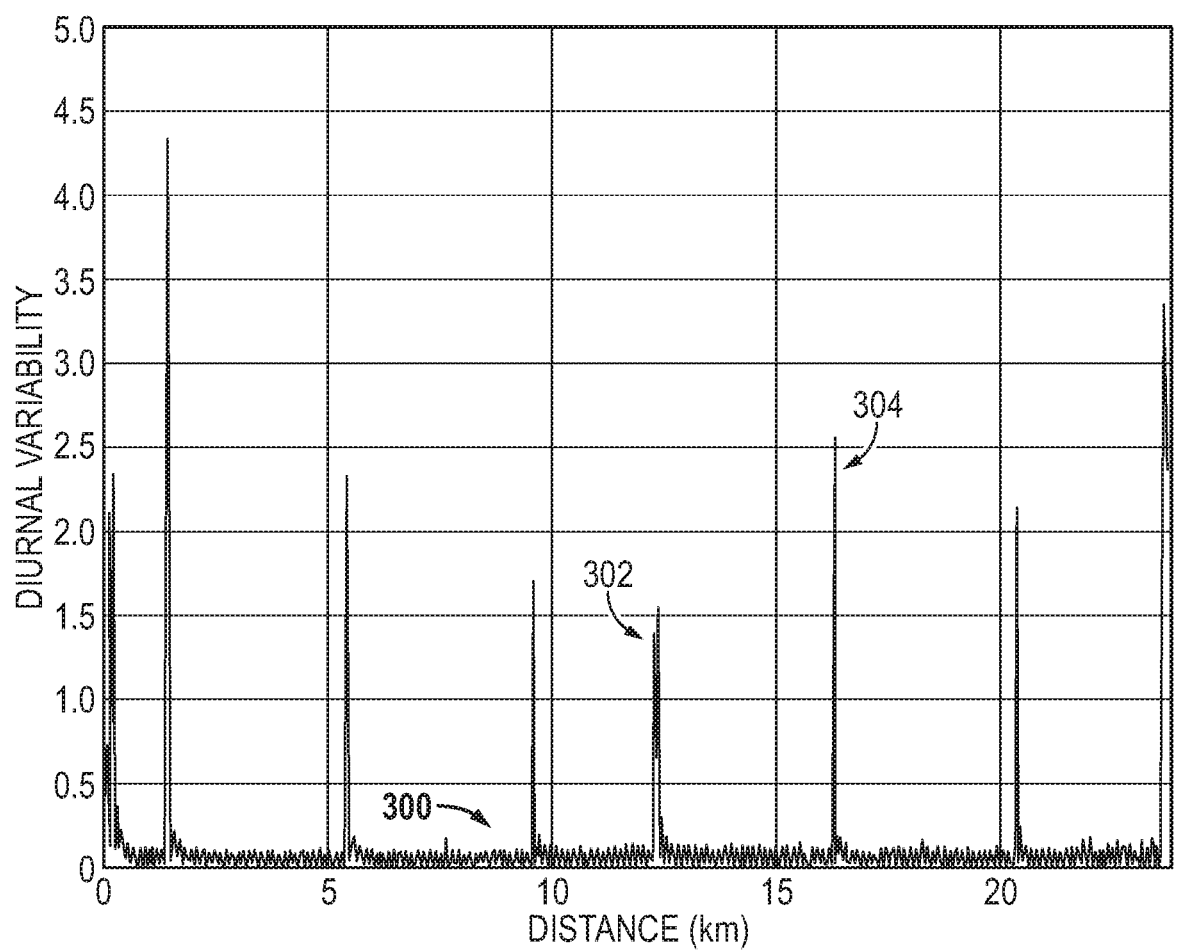

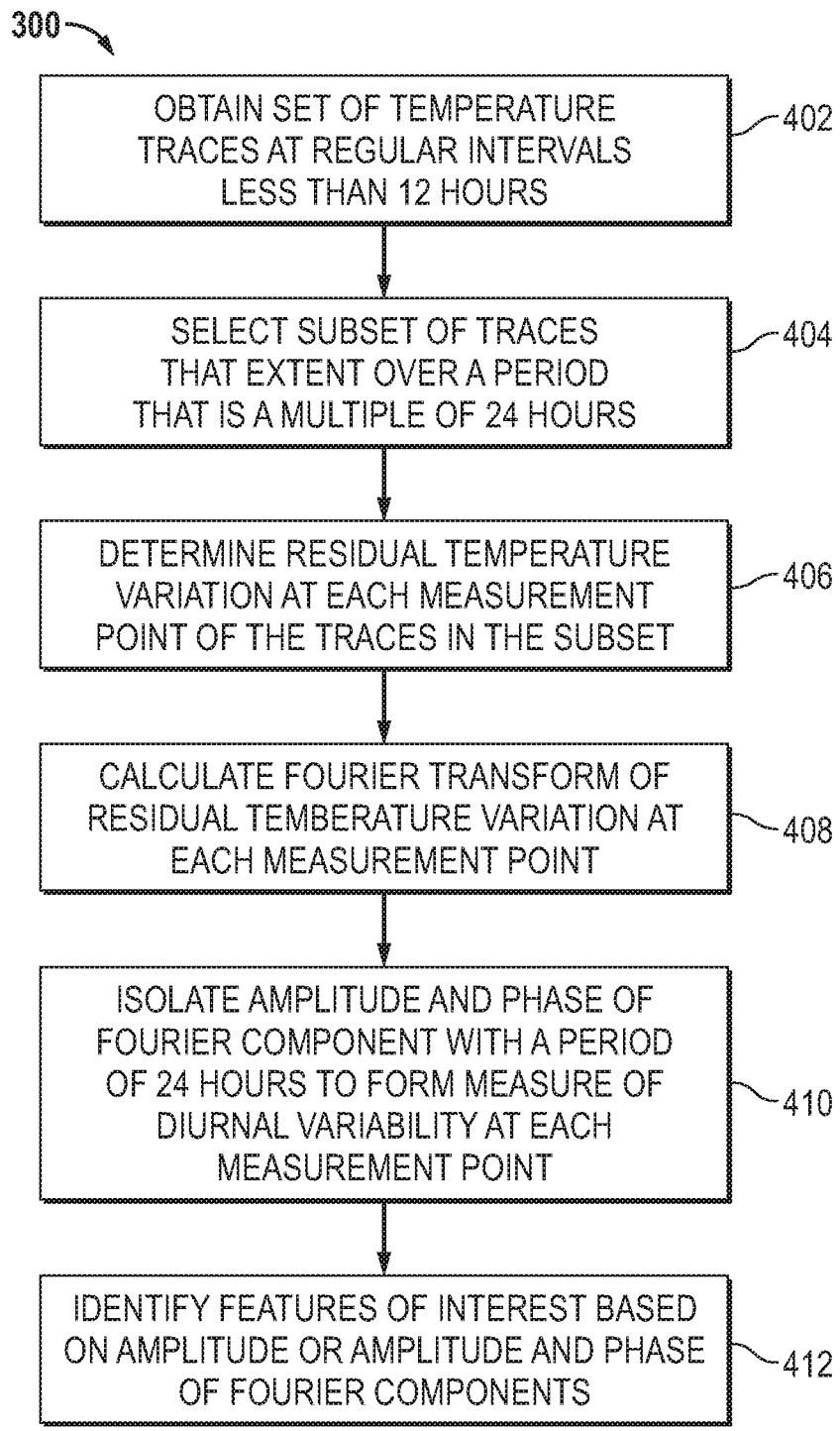

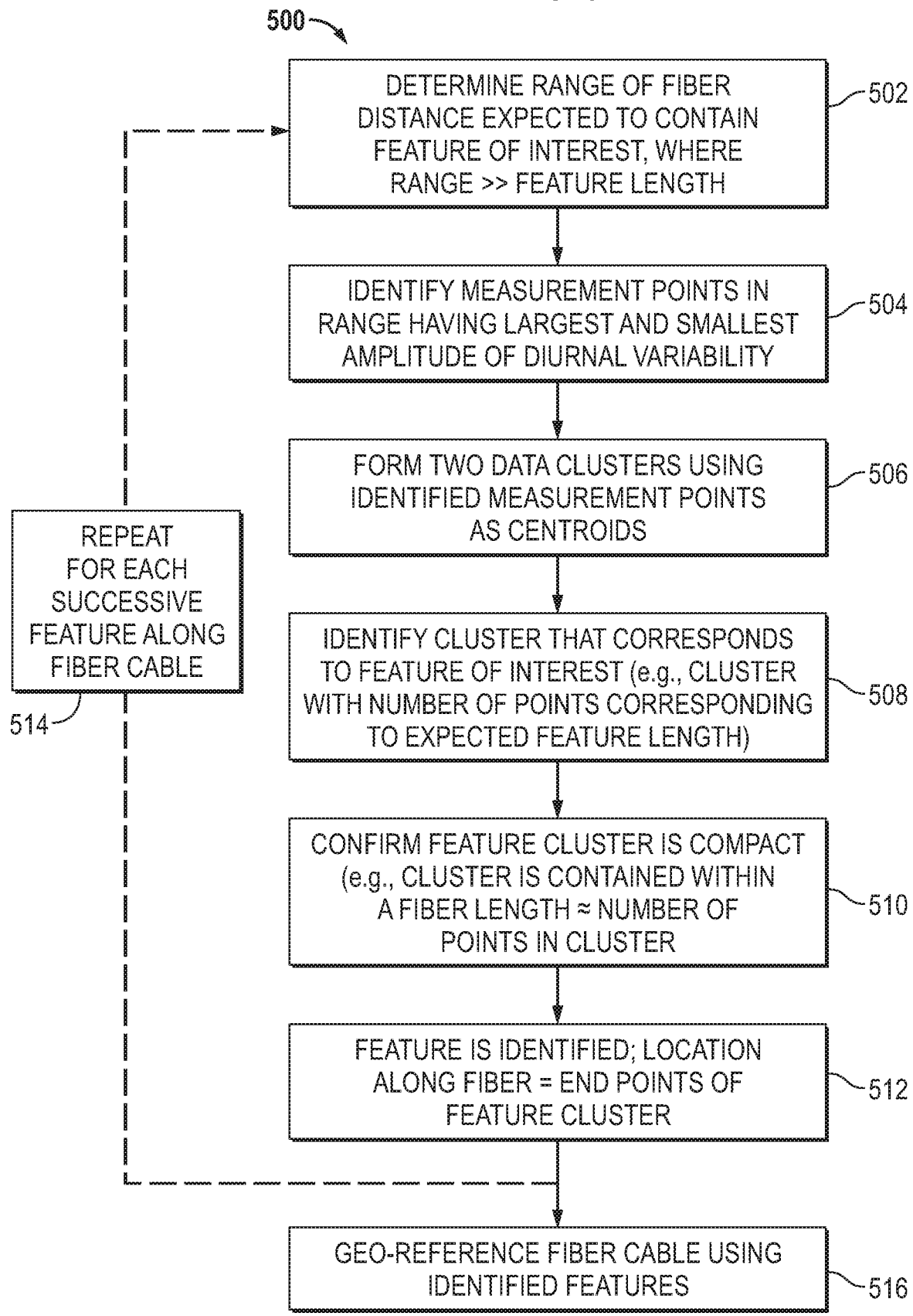

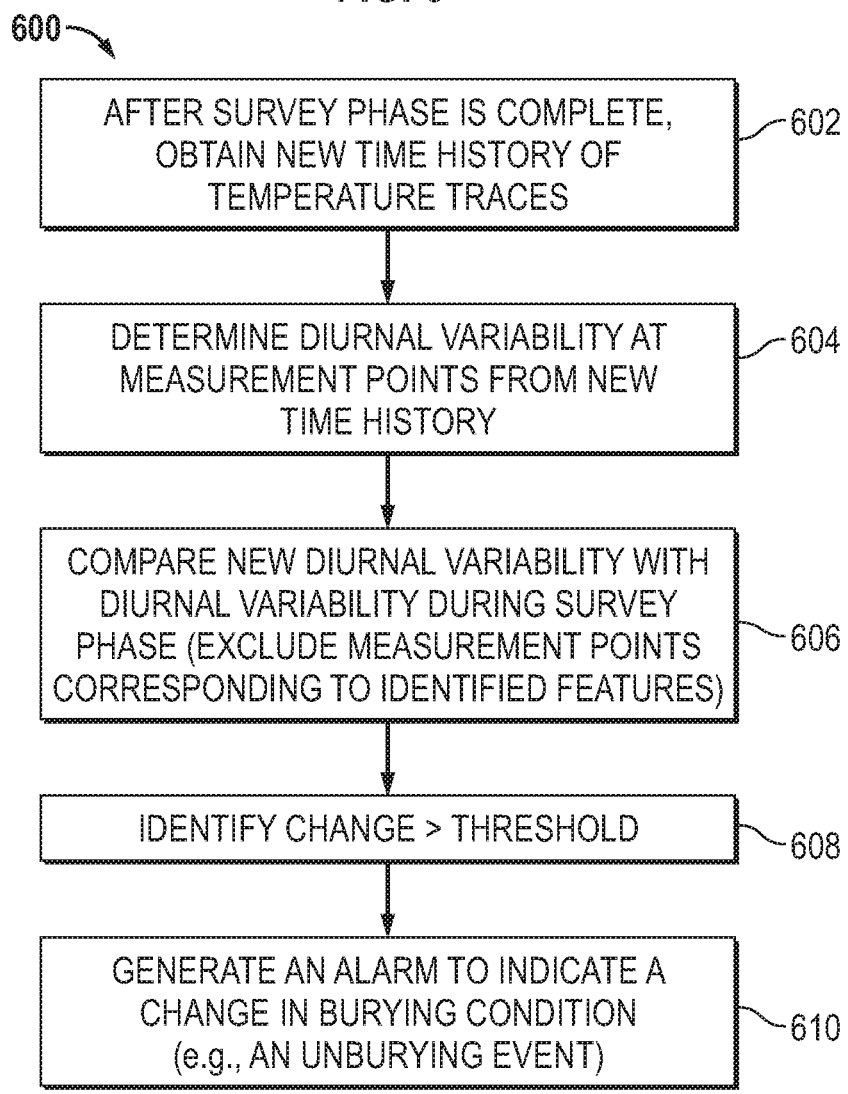

IDENTIFICATION OF FEATURES ON AN OPTICAL FIBER USING A DISTRIBUTED TEMPERATURE SENSOR

This application claims the benefit of U.S. Provisional Application Ser. No. 62/259,361 filed on Nov. 24, 2015, which is incorporated by reference herein in its entirety.

BACKGROUND

Hydrocarbon fluids such as oil and natural gas are obtained from a subterranean geologic formation, referred to as a reservoir, by drilling a well that penetrates the hydrocarbon-bearing formation. The hydrocarbon fluids produced from the well can be transported to other locations via a pipeline that is buried in the ground and which extends over a very long distance. Reliably obtaining information about the integrity of the pipeline, as well as information about other structures that extend over long distances, can be difficult.

One manner in which information can be obtained about the condition of a structure is to use a distributed fiber optic sensing system, such as a distributed temperature sensing (DTS) system or a distributed vibration sensor (DVS) (also referred to as a distributed acoustic sensor (DAS)) system. Fiber optic sensors employ the fact that environmental effects, such as pressure, strain, vibration, and temperature, can alter the amplitude, phase, frequency, spectral content, or polarization of light propagated through an optical fiber. Advantages of fiber optic sensors include their light weight, small size, passive nature, energy efficiency, and ruggedness. In addition, fiber optic sensors have the potential for very high sensitivity, and wide bandwidth. In general, measurements are made using fiber optic sensors by detecting returned light that is scattered by naturally-occurring reflective features in the fiber in response to a probe signal, and can be based on spontaneous Raman scattering, stimulated Brillouin scattering, or Rayleigh scattering. When a distributed fiber optic sensor is used with an appropriate measuring system to interrogate and acquire information from the sensor, selected environmental parameters can be monitored at multiple locations at the same time.

SUMMARY

According to various embodiments, a distributed temperature sensing (DTS) system is operated to obtain temperature measurements at measurement points along a fiber optic cable that is buried within a ground material. The temperature measurements are used to determine the diurnal temperature variability at each of a plurality of the measurement points along the fiber. Using the diurnal variability, a first feature of interest on the fiber optic cable is identified by identifying first measurement points along the fiber optic cable at which the diurnal temperature variability is indicative of a change in the burial condition of the fiber optic cable relative to adjacent sections of the cable. A geo-reference for the fiber optic cable can then be established by associating a distance along the fiber optic cable that corresponds to the first measurement points with a known geographic location of the identified feature of interest.

In another embodiment, a fiber optic cable is geo-referenced by connecting a DTS instrument to a fiber optic cable that has sections directly buried within a ground material adjacent a structure to be monitored. The DTS instrument is operated to obtain a time history of temperature at measurement points along the fiber optic cable at regular time intervals over multiple 24-hour periods. Based on the time history, a data set is determined that includes diurnal temperature variability at the measurement points. A feature of interest along the fiber optic cable is identified based on the amplitude of the diurnal temperature variability at measurement points within a first distance from the DTS instrument. The identified feature is at a known geographic location where the fiber optic cable is not directly buried within the ground material. A distance along the fiber optic cable is associated with the known geographic location to generate a geo-reference for the fiber optic cable.

In a further embodiment, a system includes a fiber optic cable buried within a ground material adjacent a structure to be monitored. Features of interest are located on the fiber optic cable at known geographic locations, and a burial condition of the fiber optic cable at the corresponding feature of interest is different than a burial condition of the fiber optic cable outside the corresponding feature of interest. The system also includes a distributed temperature sensing (DTS) system communicatively connected to the fiber optic cable to launch optical signals into the fiber optic cable to obtain a survey of temperature at measurement points at regular time intervals over multiple 24-hour periods. The survey is indicative of measures of diurnal temperature variability at the corresponding measurement points along the cable. A processing system is provided to analyze the survey to identify measurement points at which the measures of diurnal temperature variability are indicative of a change in the burial condition along the length of the fiber optic cable. The identified measurement points correspond to the known geographic locations of the features of interest and thereby provide geo-references for converting distance along the fiber optic cable to a geographic location.

BRIEF DESCRIPTION OF THE DRAWINGS

Certain embodiments of the invention are described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current invention.

FIG. 3 shows an example plot of the temperature variability along the length of the fiber cable, according to an embodiment.

FIG. 4 is an example process flow for determining temperature variability along the length of the fiber cable, according to an embodiment.

FIG. 5 is an example process flow for identifying features of interest based on temperature variability, according to an embodiment.

FIG. 6 is an example process flow for identifying unintentional burying of the fiber cable after the survey phase, according to an embodiment.

DETAILED DESCRIPTION

Figure 1:
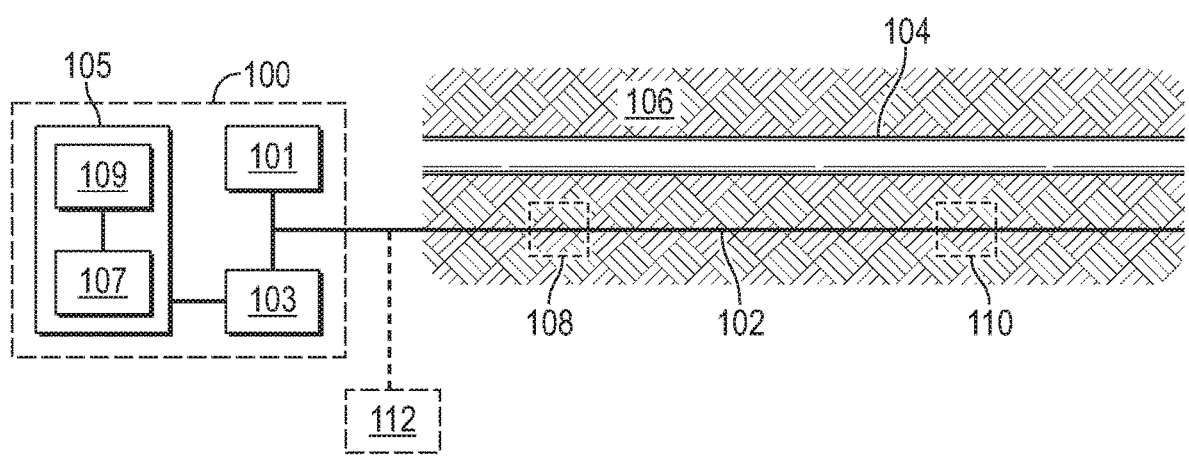
FIG. 1 is a schematic representation of an example of application in which a DTS system is connected to a fiber optic cable to monitor a structure, according to an embodiment.

In the following description, numerous details are set forth to provide an understanding of the present invention.

However, it will be understood by those skilled in the art that the present invention may be practiced without these details and that numerous variations or modifications from the described embodiments may be possible.

In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the invention.

Embodiments disclosed herein are directed to systems and techniques whereby a distributed temperature sensing (DTS) system is operated to identify temperature events along a fiber optic cable that correspond to specific features that are at known physical or geographical locations in the region of the fiber optic cable. The temperature information is used to convert distance along the cable to the known physical or geographical locations so that the physical/geographic location of a subsequent measured event obtained from fiber optic cable can be determined.

DTS systems have long been used to monitor the integrity of various structures. For example, DTS has been used to monitor electrical cables for localized overheating that may be due, for example, to disturbance of the backfill material in a buried installation. More recently, DTS has been used to detect leakage in buried oil and gas pipelines based on the characteristic thermal signature caused by the leak. Similarly, a distributed vibration sensor system (DVS—sometimes also called a distributed acoustic sensor or DAS) has been used to detect the vibration or noise produced by gas, oil, or other fluid escaping from a leak. Distributed strain sensors—which are often combined with DTS—have been used to detect ground movement which can be caused by, or give rise to, a pipeline leak.

DTS and DVS systems all are potentially capable of operating using long lengths of optical fiber, in some cases more than 100 km. Each of these systems provides an indication of the quantity or parameter they measure, or the event they are designed to detect, based on its distance along the optical fiber from the measuring instrument. This distance generally is derived from the time delay between transmission of an optical signal from the measuring instrument and the signal's return from the point of measurement.

The user of such systems often needs to know the physical location of the measurement or event indication on the structure being monitored, or alternatively its geographical location (expressed in a geographical coordinate system). Converting from distance along the optical fiber to a geographical location (referred to as "geo-referencing") is not a trivial operation, as it requires detailed knowledge of the routes of both the structure being monitored and the fiber cable, together with any additional extra lengths of fiber that may be present. For example, in many deployments, the fiber cable is routed into a splicing chamber for connection between cable sections, such that a coil of excess fiber is present at the end of each section within the chamber. The exact length of these coils may not be known in advance or may be modified over time, as it may be necessary to break and re-splice a joint, either during installation or following repair or re-configuration of an existing installation.

In general, the uncertainty in geographical position arising from such effects is cumulative with distance along the fiber cable, and towards the end of a long cable the uncertainty may be so great as to reduce the utility of the measured data. For example, if a pipeline leak is indicated, an excessively long section of the pipeline may have to be accessed for inspection and repair.

Some techniques of improving the accuracy of location exist and are well-known. For example, a localized heat source such as a hot-air gun can be applied to an accessible part of the fiber cable while a DTS temperature measurement is made. The temporary feature introduced by the heat source can be identified on the measured temperature trace and associated with its known location. The procedure generally needs to be repeated at different locations along the fiber cable. A similar approach can be taken using a localized vibration generator with a DVS system.

However, these techniques are time and resource intensive, and can be impractical when the cable is in hostile or difficult terrain. Further, communications between the system operator and the field operator with the heat gun or localized vibration generator may be difficult. Yet further, it may be impractical even to access the fiber cable.

Accordingly, embodiments described herein disclose systems and techniques to make determinations of the location along the fiber of specific features at known physical or geographical locations, with no need to physically access the fiber cable at the remote locations, in order to aid in geo-referencing the fiber.

Embodiments of the present disclosure include a distributed temperature sensor (DTS) instrument connected to the fiber cable to be surveyed so that geo-referencing can be performed. As an example, in a structural monitoring application, the DTS instrument can comprise one of the sensing systems already in place to monitor the structure. Or, the DTS instrument can be temporarily connected to the fiber cable during the commissioning or geo-referencing survey phase. In installations where the DTS instrument does not form part of the structural monitoring application, then a spare fiber within the cable can be dedicated to DTS use. Or, the DTS instrument can be temporarily attached to an optical fiber in the cable in place of another instrument such as a DVS instrument.

It is well-known that an object buried in the ground experiences a much reduced diurnal variability of temperature compared to one on the surface, even when buried at a depth of less than one meter. More deeply buried objects experience an even more reduced temperature range, even over seasonal variations. This reduction in temperature variability depends on the thermal properties of the ground material, but is almost everywhere present. Measurements of the temperature of a buried optical fiber cable display this effect.

However, it is found that when the fiber cable is not buried directly in the ground material, even if it is not on the surface, there is much less reduction in diurnal variability. For example, fiber cable in an underground splice chamber shows much greater diurnal variability than adjacent directly buried cable, because convection of the air within the splice chamber acts to transfer heat to and from the cable to the chamber cover, which is exposed to the surface.

Furthermore, the burial of the cable causes its response to diurnal temperature changes to be delayed relative to the surface temperature: this delay also increases with burial depth.

Accordingly, temperature data that is acquired from the cable over a period of time during a survey phase can provide information that is indicative of a location at which the cable is not directly buried in the ground material, such as the location of a feature such as a splice chamber. Because the physical or geographical location of the feature is known, the data obtained from the cable during the survey can be used to convert distance along the optical fiber to a specific physical or geographic location.

In embodiments disclosed herein, a DTS instrument is operated to obtain temperature measurements along the length of the fiber cable. The temperature measurements are then used to calculate a measure of diurnal temperature variability at each point along the cable. This calculation is used to identify points at which the diurnal temperature variability changes rapidly over a short length of the cable. These points can generally be identified unambiguously with features such as splice chambers, cable junctions, equipment rooms, and other places where the cable burial conditions change, and their geographic locations can therefore be identified with specific distances along the fiber. By performing such identifications starting with the feature points closest to the DTS system and working along the fiber, the accumulation of distance error along the fiber can be avoided, thereby improving the reliability of association of feature points with known physical or geographic locations.

Turning now to the example embodiment shown in FIG. 1, a DTS system 100 is connected to a fiber cable 102, disposed to monitor a structure 104 which can be for example a gas pipeline. The structure 104 and the cable 102 are generally buried within a ground material 106. At known locations along the structure 104, the fiber cable 102 passes through one or more underground splice chambers, such as chambers 108 and 110. Of course, the fiber cable 102 can pass through other features, such as an equipment room as another example.

In general, the DTS instrument 100 includes an optical source 101 (e.g., a laser) to launch light into an optical fiber within the cable 102, a detector 103 to detect backscattered light generated by the optical fiber in response to the launched light, and an acquisition/processing system 105 to acquire information from the detected backscatter that is indicative of the monitored parameter (i.e., temperature) at locations distributed along the length of the optical fiber. The DTS system 100 also can include one or more processing devices 107 (e.g., microcontroller, microprocessor, etc.) and one or more memory devices 109 to store instructions of software for operating the instrument 100 and/or for processing information received from the optical fiber. Information received from the optical fiber can also be stored in one or more memory devices for later retrieval and/or processing. A variety of distributed temperature sensing techniques are known in the art and any of those techniques can be employed with the DTS system 100 of FIG. 1.

Figure 2:
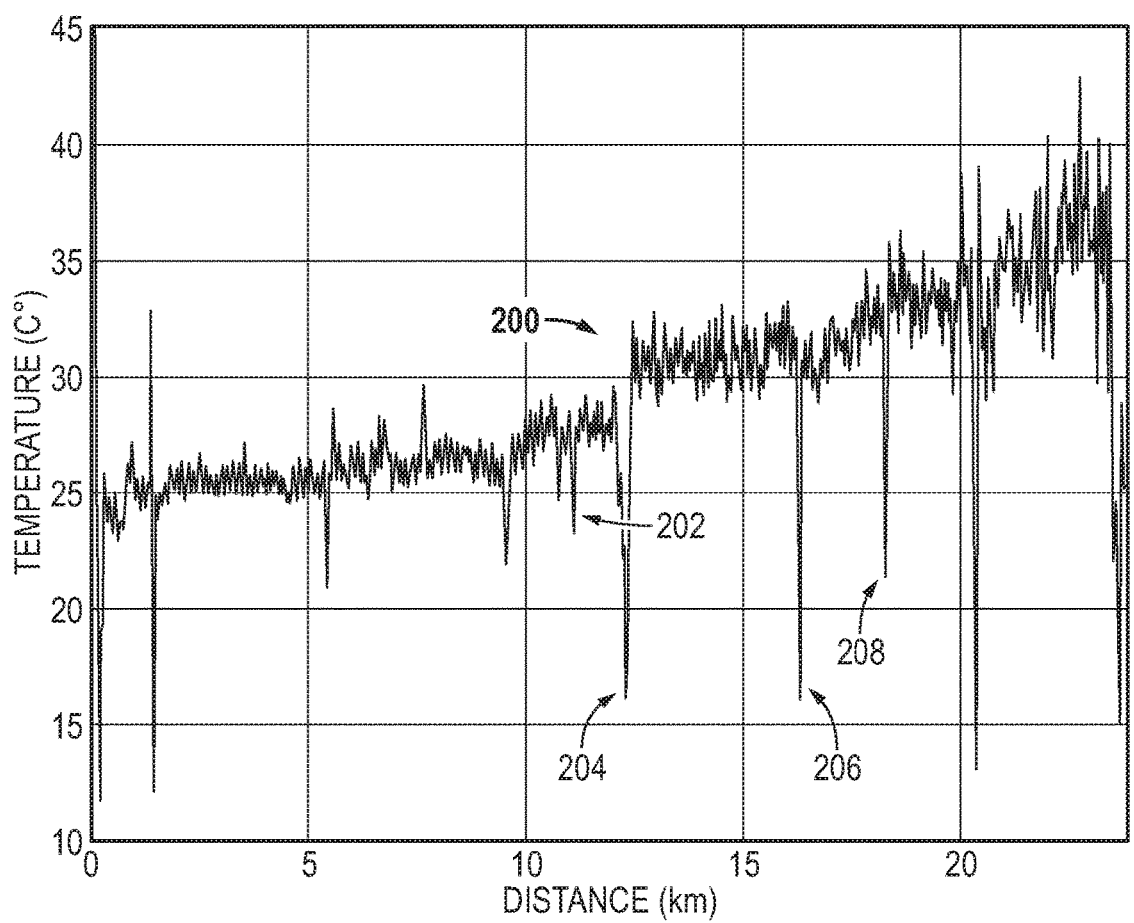
FIG. 2 shows an example temperature trace measured by the DTS system of FIG. 1 during a survey phase.

FIG. 2 shows an example temperature trace 200 measured by the DTS 100, where the vertical axis of the graph represents temperature (measured in ° C.) and the horizontal axis represents distance (measured in kilometers) along the cable 102 relative to the DTS system 100. As can be seen in FIG. 2, various temperature features 202, 204, 206, 208 are apparent at different distances along the fiber cable 102.

FIG. 3 shows a plot 300 of the temperature variability along the length of the fiber cable 102, calculated in the manner that will be described below. The vertical axis of the graph represents diurnal variability and the horizontal axis again represents distance (measured in kilometers) along the cable 102. In plot 300, various features 302, 304 are apparent at different distances along the fiber 102.

To obtain the temperature trace shown in FIG. 2 and the plot of diurnal variability of FIG. 3, the DTS 100 is operated to produce temperature measurements along the length of an optical fiber within the fiber cable 102 at approximately regular time intervals. All the measurements taken over one such interval form a temperature trace, such as the trace 200 in FIG. 2, which is a plot of temperature against distance along the fiber.

Corresponding points from a succession of temperature traces 200 provide a time history of the temperature variation at that point along the fiber within the cable 102. To generate the time history, the interval at which the DTS system 100 measures temperature traces 200 is less than 12 hours, such as at intervals of 3 hours or less. Regardless of their duration, the intervals should be regular and simple fractions of 24 hours. During the survey or commissioning phase, the series of regular temperature measurements should continue for at least 24 hours, such as for 96 hours or longer.

In addition to temperature, the DTS system 100 also records the time and date of each temperature trace 200 it measures in order to generate the time history.

In applications in which the DTS system 100 also is used during the normal operation of the structural monitoring system, the above-mentioned operating constraints apply only during the commissioning or survey phase in which the baseline time history is being recorded.

Referring now to the example process flow 400 in FIG. 4, the baseline time history of temperature traces 200 measured during the commissioning or survey phase can then be used to obtain the measure of diurnal variability 300, which is calculated at each point along the fiber 102 as follows:

At block 402, if the temperature traces 200 have not been measured at regular intervals, or if the measurement interval is not a simple fraction of 24 hours, the set of temperature traces 200 is resampled to a set of times which are at a regular interval, such as an interval of 3 hours. Although 3 hours is used as an example, it should be understood that longer or shorter resampling intervals can be used. However, the interval must not exceed 12 hours and the interval should be a simple fraction of 24 hours, such as a simple binary fraction of 24 hours.

The resampling can be performed using any of the well-known techniques that exist for this purpose, although straightforward linear interpolation is generally adequate. The selection of the resampling technique will depend on the original measurement interval; the criteria for this selection are well-known to those skilled in the art.

At block 404, a subset of the measured or resampled traces 200 is selected, extending over a period comprising a multiple of 24 hours.

At block 406, at each point along the subset of traces 200, the mean value and linear trend over time of the sequence of measurements are calculated and subtracted, giving a residual temperature variation.

At block 408, at each point along the subset of traces 200, the Fourier transform of the residual temperature variation is calculated.

At block 410, the amplitude and phase of the Fourier component with a period of 24 hours are isolated, and form the measure of diurnal variability for that point along the fiber.

Thus the measure of diurnal variability is the amplitude and phase (or equivalently the real and imaginary parts) of the one-per-day component of temperature variation at each point along the fiber 102.

At block 412, the features of interest (e.g., temperature features that correspond to splice chambers 108, 110) along the cable 102 are identified. In many cases, the features of interest can be identified using just the amplitude component of the measure of diurnal variability. By way of example, in FIG. 3, plot 300 corresponds to the amplitude component of diurnal variability calculated from a set of temperature traces similar to the trace 200 shown in FIG. 2. Features 302, 304 where the amplitude component varies markedly over a short distance range are readily identified. These features correspond with observable features 204, 206 in the temperature trace 200, but the reverse is not true. That is, there are visible temperature features 202, 208 in trace 200 which do not have a corresponding distinct diurnal variability signature in the plot 300. The presence of such temperature features can make identifying known physical features using only a temperature trace, such as trace 200, imperfect. But by using the techniques described herein, which further calculate diurnal variability to identify the features of interests, identification of the features of interest can be performed more reliably.

Identification of features using the amplitude component of diurnal variability can be done visually, using a plot of the form of FIG. 3, or identification can be performed automatically. When the amplitude component alone does not provide enough discrimination to identify the features, it can be combined with the phase component in the form of a vector. Because of the difficulty of visual presentation, this lends itself to using automatic, rather than manual identification.

An example process for performing automatic feature identification uses cluster analysis, many techniques for which are well-known. By way of example, the use of the k-means clustering technique to identify features using the measure of diurnal variability will be described with reference to the example process flow 500 of FIG. 5.

The value of k used in this example is 2.

At block 502, starting from the end of the fiber cable 102 nearest to the DTS instrument 100, determine the range of fiber distances expected to contain the first geographically located feature 108 with a high probability, based on the estimated uncertainty in fiber length between the DTS instrument 100 and the feature 108, and the expected length of the feature 108 itself. This range should be much wider than the expected feature length.

At block 504, within this range of the measurement data, locate the points having the largest and smallest amplitude of diurnal variability.

At block 506, form "k" (e.g., 2) data clusters by taking the amplitude and phase values (or preferably the real and imaginary components) of the two points as the initial values for the centroids of the two clusters into which the variability data will be partitioned, and iterating the k-means algorithm (with k=2) until convergence is obtained.

At block 508, apply a plausibility test: one cluster should contain approximately the number of points corresponding to the expected feature length—this is the feature cluster.

At block 510, apply a consistency test: the feature cluster should be compact, i.e. it should be contained within a fiber length equal to or only slightly more than the number of points it contains.

If these tests pass, the feature has been identified and its position may be determined from the two end points of the feature cluster (block 512). Otherwise, the algorithm may be restarted with different initial points, or manual intervention may be requested.

The above steps are repeated for each successive geographically located feature (block 514). The fiber distance of each identified feature is used to reduce the uncertainty in fiber length to the next feature.

At block 516, once all features are identified, they are used to geo-reference the fiber distance. This enables DTS measurements, and where used DVS and distributed strain measurements, on the same fiber cable to also be geo-referenced, as needed for structural monitoring or detection of disturbances, such as movement of the ground material, landslip, flooding, or third party interference with the structure. In applications in which DVS or distributed strain measurements are obtained, the DTS system 100 can be used with a dedicated fiber within the fiber optic cable 102. Or, as schematically represented by dashed lines in FIG. 1, the DTS system 100 can be disconnected from the fiber cable 102 after the survey phase is complete and a DVS system 112 can be connected in place of system 100. DVS system 112 can be configured in accordance with any of a variety of systems and techniques for obtaining distributed vibration and distributed strain measurements that are well-known to those of skill in the art and which are suitable to monitor the particular type of event of interest.

Once the commissioning or survey phase is complete, the geo-referencing does not need to be repeated unless the fiber cable 102 is modified. Modifications could include, for example, a section of cable 102 that is replaced due to damage, or a new feature such as an additional splice chamber that is added to the cable route. Under these circumstances, the entire procedure of measuring a series of DTS temperature traces 200, calculating the measure of diurnal variability 300, and identifying features (process flows 400, 500), can be repeated. It is possible to simplify the feature identification phase if the approximate location of the cable modification is known: features closer to the DTS system 100 than the point of modification will be at unchanged fiber distances.

Techniques described herein also can be used to detect unintentional unburying of a buried fiber cable. For example, this might be caused by earth movement (landslips), floods, or third-party interference. In this mode of use, as shown in the example process flow 600 in FIG. 6, the entire procedure of measuring a series of DTS temperature traces 200 (block 602), and calculating the measure of diurnal variability 300 (block 604) is repeated at regular intervals. Feature identification (flows 400, 500) is not appropriate after the initial commissioning and survey phase in this mode of use. Instead, the diurnal variability 300 from each measurement is compared against an initial measurement taken during the commissioning and survey phase (block 606). The comparison is restricted to those sections of fiber corresponding to buried cable 102, i.e., the features identified during the survey are excluded. Either the amplitude alone or the amplitude and phase together can be compared. A change exceeding a threshold value can be used to give alarm of a possible unburying event (blocks 608, 610). The actual change can be an increase or decrease in amplitude, or a change of phase possibly combined with an amplitude change.

When using the phase component of the measure of diurnal variability, provided all the temperature trace 200 measurements are made in a single commissioning or survey period, the phase reference (i.e. the actual clock time equivalent to a phase of 0°) does not matter. However, when used to detect unburying, the phase reference should be constant. Generally, the series of regular measurements (or resampled measurements) in the unburying mode of use should start at the same time each day.

However, if the measurements of diurnal variability taken during the commissioning or survey phase are to be used as a reference for the detection of unintentional unburying, they too should be started at the same time each day. Because it may happen that detection of unburying is required only at some time after the commissioning or survey phase, it is preferable that all such measurements are started at the same time each day, regardless of the original application.

Instructions for performing the process flows 400, 500, 600, or portions of those process flows, can be stored in memory devices and executed by processing devices in a processing subsystem of the DTS system 100. In some embodiments, the data acquired from the fiber can be stored in a memory device of the DTS system 100 and then transmitted or conveyed to a processing system at a remote location and the process flows 400, 500, 600 then can be performed at a later time. It should be understood that the various processing blocks of the process flows 400, 500, 600 shown in FIGS. 4-6 are exemplary only and that the flows may include other, fewer or additional processing blocks. Yet further, certain of processing blocks of the flows 400, 500, 600 can be performed in parallel rather than serially as illustrated in the Figures or in different orders.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the invention.

What is claimed is:

1. A method of identifying features on a fiber optic cable, comprising:
    operating a distributed temperature sensing (DTS) system to obtain temperature measurements at measurement points along a fiber optic cable that is buried within a ground material;
    determining diurnal temperature variability at each of a plurality of the measurement points based on the temperature measurements;
    identifying a first feature of interest on the fiber optic cable based on identifying first measurement points along the fiber optic cable at which the diurnal temperature variability is indicative of a first section of the fiber optical cable that has a burial condition that is different than adjacent sections of the fiber optic cable; and
    establishing a geo-reference for the fiber optic cable by associating a first distance along the fiber optic cable that corresponds to the first measurement points with a known geographic location of the identified feature of interest.

2. The method as recited in claim 1, wherein the temperature measurements are obtained during a survey phase that extends over a period of time comprising a multiple of 24 hours.

3. The method as recited in claim 2, wherein the temperature measurements are obtained at intervals that are a simple fraction of a 24 hour period that is less than 12 hours.

4. The method as recited in claim 2, comprising:
    generating a baseline diurnal temperature variability for measurements points that correspond only to sections of the fiber optic cable that are directly buried in the ground material during the survey phase;
    obtaining further temperature measurements at the measurement points after the survey phase is complete;
    determining a further diurnal temperature variability at corresponding measurement points based on the further temperature measurements;
    comparing the further diurnal temperature variability with the baseline diurnal temperature variability to identify a section of the fiber optic cable for which the burial condition has changed after the survey phase was complete; and
    identifying a geographic location of the portion of the fiber optic cable that has the changed burial condition based on the geo-reference.

5. The method as recited in claim 1, wherein the first measurement points comprise a first range of measurement points that extends over the first section of the fiber optic cable, and wherein the diurnal temperature variability of the measurement points within the first range is greater than the diurnal temperature variability at measurement points adjacent to start and end points of the range.

6. The method as recited in claim 5, wherein identifying the feature of interest comprises confirming that the first range of measurement points extends over a length of the fiber optic cable that corresponds approximately to an expected length of the feature of interest.

7. The method as recited in claim 5, further comprising:
    identifying a second feature of interest on the fiber optic cable based on identifying a second range of measurement points along the fiber optic cable in which the diurnal temperature variability is indicative of second section of fiber optic cable that has a burial condition different than adjacent sections of the fiber optic cable; and
    wherein the geo-reference for the fiber optic cable is further established by associating a second distance along the fiber optic cable with a known geographic location of the second identified feature of interest.

8. The method as recited in claim 7, wherein the first distance is the distance between the DTS system and the first range of measurement points and the second distance is the distance between the first range of measurement points and the second range of measurement points.

9. The method as recited in claim 1, further comprising operating the DTS system to detect an event of interest associated with a structure adjacent the fiber optic cable; and
    determining the geographic location of the event of interest based on the geo-reference.

10. The method as recited in claim 9, wherein the structure is one of a pipeline and a power cable.

11. The method as recited in claim 1, further comprising operating a distributed vibration sensing (DVS) system communicatively connected to the fiber optic cable to detect an event of interest; and determining the geographic location of the event of interest based on the geo-reference.

12. The method as recited in claim 11, wherein the event of interest is a disturbance of the ground material or the structure.

13. A method of geo-referencing a fiber optic cable, comprising:
    connecting a DTS instrument to a fiber optic cable having sections that are directly buried within a ground material adjacent a structure to be monitored;

operating the DTS instrument to obtain a time history of temperature at measurement points along the fiber optic cable at regular time intervals over multiple 24-hour periods;

determining, based on the time history, a data set comprising diurnal temperature variability at the measurement points;

identifying a feature of interest along the fiber optic cable based on an amplitude of diurnal temperature variability at measurement points within a first distance from the DTS instrument, wherein the identified feature is at a known geographic location where the fiber optic cable is not directly buried within the ground material; and associating a distance along the fiber optic cable with the known geographic location to generate a geo-reference for the fiber optic cable.

14. The method as recited in claim 13, wherein identifying the feature of interest comprises applying a clustering technique to the diurnal temperature variability data set.

15. The method as recited in claim 14, wherein the clustering technique comprises a k-means clustering technique.

16. The method as recited in claim 13, wherein identifying the feature of interest comprises:

determining a first distance range along the fiber optic cable in which the feature of interest is expected to be located, wherein the first distance range spans a distance that is substantially greater than an expected length of the feature of interest;

identifying measurement points within the first distance range that have the largest diurnal temperature variability and the smallest diurnal temperature variability;

using the identified measurement points to partition the diurnal temperature variability data set for the first distance range into corresponding data clusters; and identifying the data cluster containing measurement points extending over a distance that corresponds approximately to the expected length of the feature of interest, thereby identifying the feature of interest.

17. The method as recited in claim 16, further comprising associating the measurement points corresponding to the end points of the identified data cluster with the known geographic location of the feature of interest.

18. A system, comprising:

a fiber optic cable buried within a ground material adjacent a structure to be monitored, wherein features of interest are located on the fiber optic cable at known geographic locations, and wherein a burial condition of the fiber optic cable at the corresponding feature of interest is different than a burial condition of the fiber optic cable outside the corresponding feature of interest;

a distributed temperature sensing (DTS) system communicatively connected to the fiber optic cable, the DTS system configured to launch optical signals into the fiber optic cable to obtain a survey of temperature at measurement points along the fiber optic cable at regular time intervals over multiple 24-hour periods, wherein the survey is indicative of measures of diurnal temperature variability at the corresponding measurement points along the cable;

a processing system to analyze the survey to identify measurement points at which the measures of diurnal temperature variability are indicative of a change in the burial condition along the length of the fiber optic cable, wherein the identified measurement points correspond to the known geographic locations of the features of interest and thereby provide geo-references for converting distance along the fiber optic cable to a geographic location.

19. The system as recited in claim 18, wherein the processing system analyzes the survey by applying a clustering technique to the measures of diurnal temperature variability.

20. The system as recited in claim 18, where the processing analyzes the survey to identify a set of measurement points that extends over a distance that corresponds approximately to an expected length of a feature of interest, wherein the measures of diurnal temperature variability in the set have a greater amplitude than the measures of diurnal temperature variability at measurement points adjacent to the set.

21. The system as recited in claim 18, wherein the DTS further is configured to launch optical signals into the fiber optic cable to obtain temperature measurements indicative of an event of interest along the structure after the survey is complete, wherein the geographic location of the event of interest is determined by applying the geo-references provided by the survey.

22. The system as recited in claim 18, wherein at least one of the features of interest is an underground splice chamber.

23. The system as recited in claim 18, further comprising a distributed vibration sensing (DVS) system communicatively connected to the fiber optic cable, the DVS system configured to launch optical signals into the fiber optic cable to detect an event of interest associated with the structure, wherein the geographic location of a detected event of interest is determined by applying the geo-references provided by the survey.

* * * * *